(12) United States Patent
Kemmer

(10) Patent No.: US 12,370,884 B2
(45) Date of Patent: Jul. 29, 2025

(54) PRESSURIZED GAS TANK RECEIVING ASSEMBLY FOR A MOTOR VEHICLE

(71) Applicant: Robert Bosch GmbH, Stuttgart (DE)

(72) Inventor: Helerson Kemmer, Vaihingen (DE)

(73) Assignee: Robert Bosch GmbH, Stuttgart (DE)

( * ) Notice: Subject to any disclaimer, the term of this patent is extended or adjusted under 35 U.S.C. 154(b) by 396 days.

(21) Appl. No.: 17/795,791

(22) PCT Filed: Dec. 4, 2020

(86) PCT No.: PCT/EP2020/084592
§ 371 (c)(1),
(2) Date: Jul. 27, 2022

(87) PCT Pub. No.: WO2021/151561
PCT Pub. Date: Aug. 5, 2021

(65) Prior Publication Data
US 2023/0055646 A1    Feb. 23, 2023

(30) Foreign Application Priority Data
Jan. 29, 2020    (DE) .................. 10 2020 201 046.3

(51) Int. Cl.
*B60K 15/07*    (2006.01)
*B60K 15/03*    (2006.01)

(52) U.S. Cl.
CPC .... *B60K 15/07* (2013.01); *B60K 2015/03019* (2013.01); *B60K 2015/03315* (2013.01); *B60K 2015/03414* (2013.01)

(58) Field of Classification Search
CPC .......... B60K 15/07; B60K 2015/03019; B60K 2015/03315; B60K 2015/03414;
(Continued)

(56) References Cited

U.S. PATENT DOCUMENTS 5,370,418 A     12/1994  Pugh
2005/0000802 A1*  1/2005  Hobbs ............... F17C 9/04
                                              205/637

(Continued)

FOREIGN PATENT DOCUMENTS

CN      1720412 A     1/2006
CN    107074060 A     8/2017
(Continued)

OTHER PUBLICATIONS

DE-102016011924-A1 (Most et al.) (Apr. 5, 2018) (Machine Translation) (Year: 2018).*

(Continued)

*Primary Examiner* — Hung Q Nguyen
(74) *Attorney, Agent, or Firm* — Michael Best & Friedrich LLP

(57) ABSTRACT

The invention relates to a pressurized gas tank receiving assembly (1) for a motor vehicle (100) for cooling pressurized gas tanks (10), wherein the pressurized gas tank receiving assembly (1) comprises: a) a main body (20) with a plurality of supporting surfaces (22) in the form of channels for receiving the pressurized gas tank (10), wherein the main body (20) is thermally conductive and has a mounting interface (26) for arrangement on a counter mounting interface (126) of a body (120) of the motor vehicle (100), wherein the main body (20) has thermally conducting surfaces (24) for thermally communicating connection to the body (120), b) pressurized gas tanks (10) for storing gas under high pressure, wherein the pressurized gas tanks (10) are thermally conductive and are interlockingly received on the supporting surfaces (22) of the main body (20), which supporting surfaces are in the form of channels, for thermal communication with the main body (20).

12 Claims, 7 Drawing Sheets

(58) Field of Classification Search
CPC .................. B60K 11/02; B60K 11/06; B60K
2015/03421; B60K 15/03006; F17C
2201/0119; F17C 2201/035; F17C
2201/058; F17C 2203/0639; F17C
2205/0107; F17C 2205/0119; F17C
2205/0142; F17C 2221/012; F17C
2223/0123; F17C 2223/036; F17C
2227/0346; F17C 2227/0348; F17C
2227/0383; F17C 2227/04; F17C
2260/023; F17C 2265/065; F17C
2270/0184; F17C 5/06; F17C 13/084;
F17C 13/02; H01M 8/04029; H01M
2250/20; H01M 8/04089; H01M 8/04201;
Y02E 60/32; Y02E 60/50
USPC ........................................................ 280/830
See application file for complete search history.

(56) References Cited

U.S. PATENT DOCUMENTS

| | | | | |
|---|---|---|---|---|
| 2005/0287407 | A1* | 12/2005 | Bushko | H01M 8/04208 141/82 |
| 2008/0302504 | A1* | 12/2008 | Handa | F17C 5/06 165/47 |
| 2019/0047404 | A1* | 2/2019 | Sawai | B60K 15/07 |

FOREIGN PATENT DOCUMENTS

| | | | | |
|---|---|---|---|---|
| DE | 102010045705 | A1 | | 7/2011 |
| DE | 102010006019 | A1 | | 8/2011 |
| DE | 102010033956 | A1 * | 1/2012 | ................ F17C 1/14 |
| DE | 102016011924 | A1 * | 4/2018 | |
| DE | 102016119444 | A1 | 4/2018 | |
| DE | 102017004902 | A1 | 11/2018 | |
| EP | 3130835 | A1 * | 2/2017 | |
| EP | 3557116 | A1 * | 10/2019 | ........... F17C 13/084 |
| JP | 2000219049 | A | 8/2000 | |
| JP | 2004293785 | A | 10/2004 | |
| JP | 2005233295 | A | 9/2005 | |
| JP | 2006316994 | A | 11/2006 | |
| JP | 2007309375 | A * | 11/2007 | |
| JP | 2008049961 | A | 3/2008 | |
| JP | 2010276059 | A | 12/2010 | |
| JP | 2011194952 | A | 10/2011 | |
| JP | 2011195063 | A | 10/2011 | |
| JP | 2013200020 | A | 10/2013 | |
| JP | 2019035442 | A | 3/2019 | |
| JP | 2019140740 | A | 8/2019 | |
| KR | 960001041 | U | 1/1996 | |
| KR | 19980052599 | U | 10/1998 | |
| KR | 20020030876 | A | 4/2002 | |
| WO | WO-2007124825 | A1 * | 11/2007 | ........... C01B 3/0005 |

OTHER PUBLICATIONS

EP-3557116-A1 (Zacharias et al.) (Oct. 23, 2019) (Machine Translation) (Year: 2019).*
JP-2007309375-A (Iwanari et al.) (Nov. 29, 2007) (Machine Translation) (Year: 2007).*
Translation of International Search Report for Application No. PCT/EP2020/084592 dated Feb. 5, 2021 (2 pages).

* cited by examiner

A1 - A1

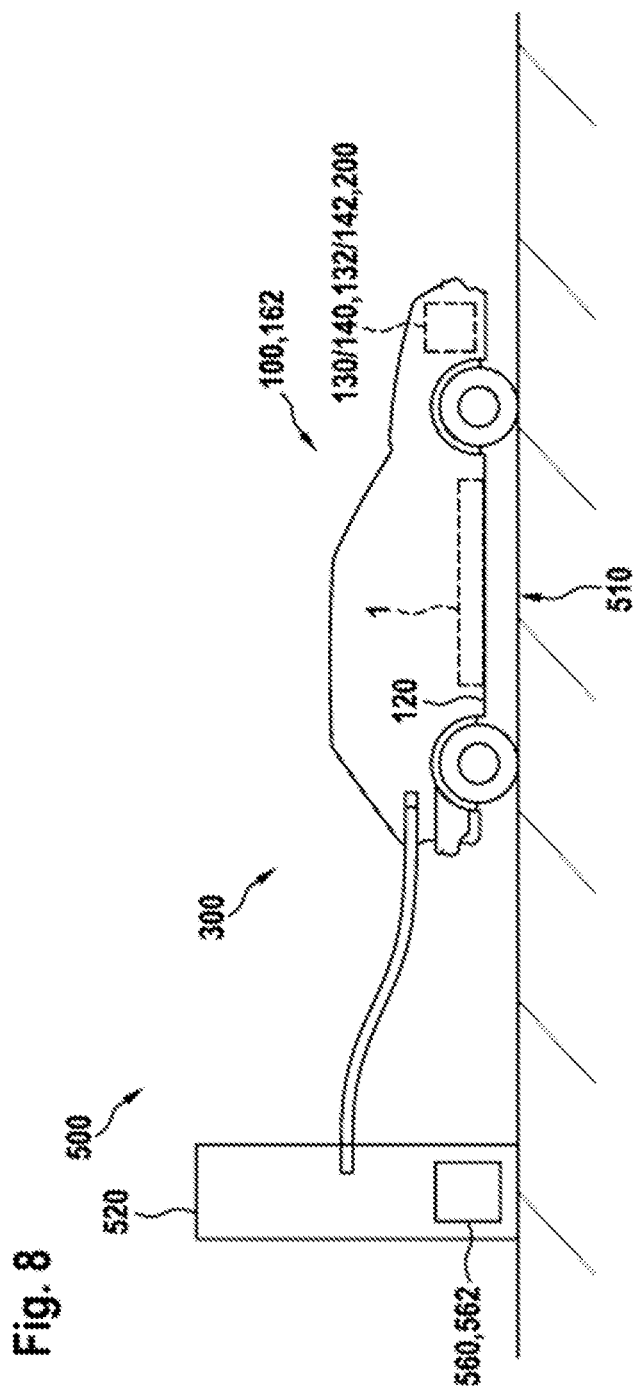

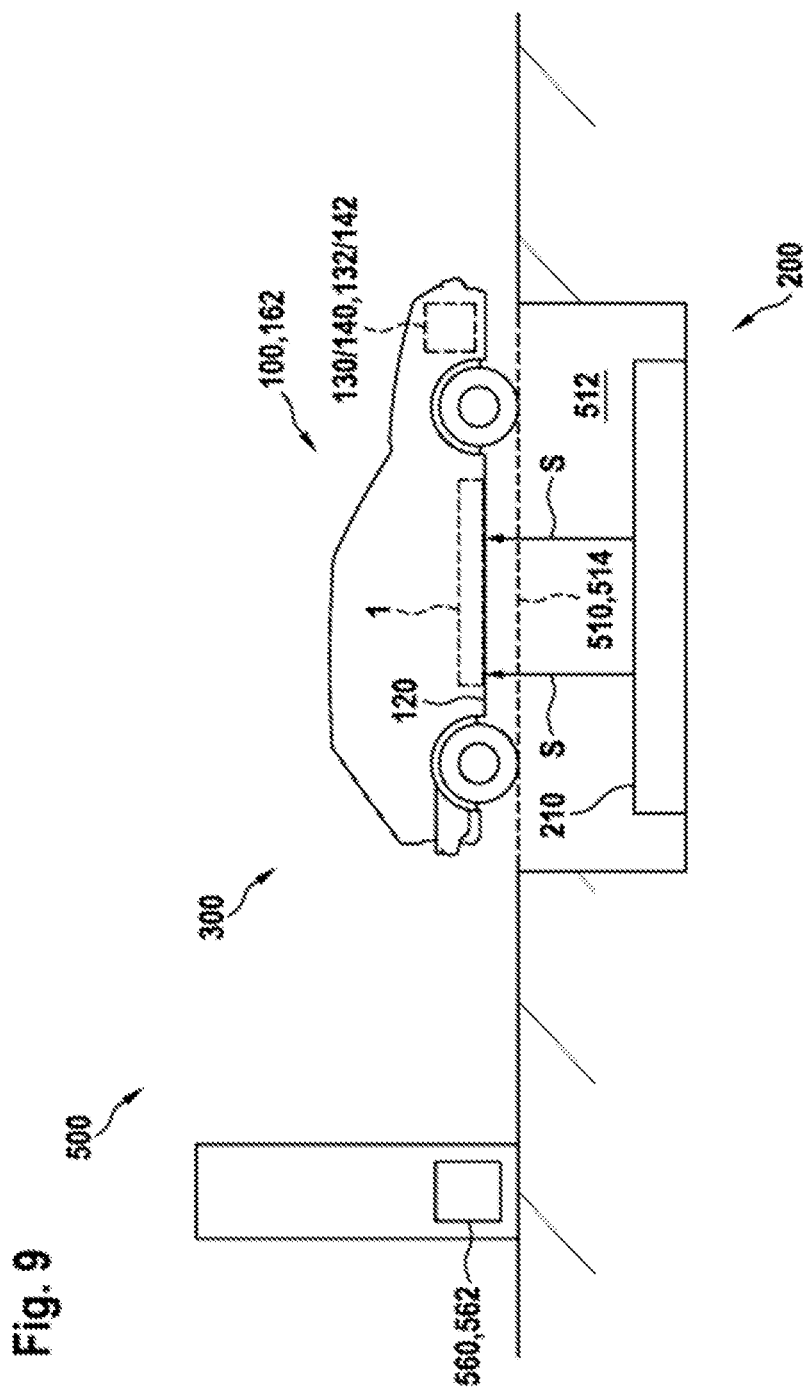

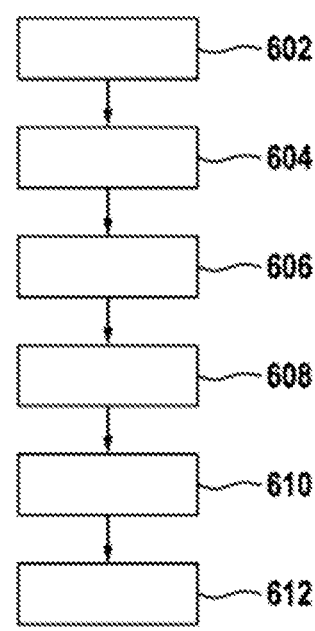

PRESSURIZED GAS TANK RECEIVING ASSEMBLY FOR A MOTOR VEHICLE

BACKGROUND

Fuel cell vehicles, which obtain the electrical drive energy from a fuel such as hydrogen, represent an alternative to conventional internal combustion engine vehicles and battery-powered electric vehicles. A full refueling of a fuel cell vehicle, at 3 minutes to 5 minutes, is comparable to a full refueling of a conventional internal combustion engine vehicle. For example, hydrogen for a fuel cell vehicle can be stored in a cylindrical pressurized gas tank, a so-called gas tank. When refueling a fuel cell vehicle at a filling station, the fuel flows from a gas tank of the filling station into the pressurized gas tank of the motor vehicle. The fuel in the pressurized gas tank is compressed during the refueling process, wherein compression energy is released in the form of heat. As a result, on the one hand, the fuel itself heats up and, thereby, the pressure of the fuel in the pressurized gas tank additionally increases. On the other hand, the pressurized gas tank also heats up. In the process, the fuel pressure in the pressurized gas tank is not to exceed a critical pressurized gas tank pressure and the temperature of the pressurized gas tank is not to exceed a critical pressurized gas tank temperature. The fueling process with respect to hydrogen refueling is therefore specified worldwide according to SAE TIR J2601.

It is known that the fuel is pre-cooled to −40° Celsius at the filling station in order to counteract the heating of the fuel during the refueling process. Therefore, the refueling time can be shortened, although the pre-cooling is associated with high costs. In addition, the pressurized gas tanks are installed in vehicles such that the pressurized gas tanks are largely surrounded by air, and so only very poor heat dissipation occurs during the refueling process via the external shell surface of the pressurized gas tanks.

SUMMARY

The present invention describes a pressurized gas tank receiving assembly, a system having a motor vehicle and a cooling device, a filling station, and a method for refueling a vehicle.

Features and details described in conjunction with the pressurized gas tank receiving assembly according to the invention also apply, of course, in conjunction with the system according to the present invention, the filling station according to the invention, and the method according to the invention, and vice versa in each case, so that, with respect to the disclosure, reference is always made and can always be made either way to the individual aspects of the invention.

According to a first aspect, the present invention describes a pressurized gas tank receiving assembly for a motor vehicle for cooling pressurized gas tanks. The pressurized gas tank receiving assembly includes a main body having a plurality of channel-shaped receiving surfaces for receiving the pressurized gas tank. The main body is thermally conductive and has a mounting interface for arrangement at a counter mounting interface of a body of the motor vehicle. In addition, the main body has thermally conductive surfaces for the thermally communicating connection to the body. In addition, the pressurized gas tank receiving assembly includes pressurized gas tanks for storing gas under high pressure, wherein the pressurized gas tanks are thermally conductive and are interlockingly accommodated on the channel-shaped receiving surfaces of the main body for thermal communication with the main body.

With the pressurized gas tank receiving assembly according to the invention, heat arising during the refueling process can be particularly advantageously conducted, in particular transferred, from the thermally conductive pressurized gas tanks via a thermally conductive main body to the body of the motor vehicle. Since the body can have a large thermal mass and a large surface area, the heat arising during the refueling process can be particularly easily, quickly, and efficiently dissipated, for example, to the surroundings. For this purpose, the thermally conductive main body of the pressurized gas tank receiving assembly includes receiving surfaces for interlockingly accommodating pressurized gas tanks. Therefore, it can be particularly advantageously ensured that the heat arising during the refueling process is conducted from the pressurized gas tank, in particular from the shell of the pressurized gas tank and, thereby, also from the gas under pressure in the pressurized gas tank, to the thermally conductive main body and/or transferred via the thermally conductive main body to the body of the motor vehicle. Advantageously, it can therefore be ensured that a pressurized gas tank pressure that is critical for the particular pressurized gas tank is not exceeded and that a pressurized gas tank temperature that is critical for the particular pressurized gas tank is not exceeded. A risk to the occupants of the motor vehicle, for example, an explosion of a pressurized gas tank, can therefore be minimized. In addition, due to the pressurized gas tank receiving assembly according to the invention, the refueling time for a full refueling of the pressurized gas tanks can be particularly short due to the particularly efficient thermal communication between the pressurized gas tanks and the body of the motor vehicle. In addition, times during which the flow of fuel must be interrupted during the refueling process, as in the fueling protocol according to SAE TIR J2601, can be dispensed with. This means that, with the pressurized gas tank receiving assembly according to the invention, a refueling of the pressurized gas tanks of the motor vehicle can be carried out continuously with respect to time.

The thermally conductive main body can particularly advantageously absorb and conduct the heat arising during the refueling process from the pressurized gas tanks via the channel-shaped receiving surfaces and dissipate this heat to the body of a motor vehicle. The thermally conductive main body can be made of a metal. The metallic main body can have a particularly high thermal conductivity. In particular, the metallic body can be at least partially made of steel and, thereby, a particularly high stability of the main body can be simultaneously ensured. In particular, the metallic main body can be made completely of steel. The thermally conductive main body can also be at least partially made of a plastic having a highly thermally conductive filler. A main body of this type can have a particularly low weight in combination with a simultaneously high thermal conductivity and can be particularly cost-effectively and easily manufactured.

Stating that the pressurized gas tanks are interlockingly accommodated on the channel-shaped receiving surfaces of the main body can be understood to mean that the pressurized gas tanks and the channel-shaped receiving surfaces are designed to be at least partially complementary to one another. Preferably, the surfaces designed to be complementary to one another contact each other such that the thermal communication between the pressurized gas tanks and the receiving surfaces is particularly advantageous.

The pressurized gas tanks can be designed to be essentially hollow cylindrical; this can mean known gas cylinders. The thermally conductive pressurized gas tanks can be made of a metal. The metallic pressurized gas tanks can each have a particularly high thermal conductivity. In particular, the metallic pressurized gas tanks can each be at least partially made of steel and, thereby, a particularly high stability of the pressurized gas tanks can be simultaneously ensured. In particular, the metallic pressurized gas tanks can be made completely of steel. The thermally conductive pressurized gas tanks can also each at least partially include a plastic having a highly thermally conductive filler. A thermally conductive pressurized gas tank of this type can have a particularly low weight in combination with a simultaneously high thermal conductivity and can be particularly cost-effectively and easily manufactured. Consequently, the heat arising during the refueling process can be particularly advantageously conducted from the pressurized gas tanks via the thermally conductive main body to the body of the motor vehicle.

In addition, the pressurized gas tank receiving assembly includes, in particular, multiple individual pressurized gas tanks. The multiple individual pressurized gas tanks can be fluidically connected to each other. Advantageously, overall, a larger external shell surface given the same storage volume can be achieved due to multiple individual, in particular small, pressurized gas tanks in comparison to a single, large pressurized gas tank. In addition, multiple individual pressurized gas tanks together can have a greater thermal mass than a single, larger pressurized gas tank given the same storage volume. The mass of the pressurized gas tank shell, in particular of the tank shell, can be understood as the thermal mass of a pressurized gas tank. In other words, the mass of the shell of the pressurized gas tank enclosing the pressurized gas, for example, hydrogen, can be understood as the thermal mass. The heat arising during the refueling process can therefore be particularly advantageously absorbed by the particularly large thermal mass of the multiple individual pressurized gas tanks. Moreover, advantageously, a particularly flat pressurized gas tank receiving assembly can be formed due to multiple individual, in particular small, pressurized gas tanks in comparison to a single, large pressurized gas tank given the same storage volume. A flat pressurized gas tank receiving assembly of this type, in particular the main body of the pressurized gas tank receiving assembly, can particularly advantageously form a portion of the body, for example, the underbody, of the vehicle. Costs can therefore be saved and the heat arising during the refueling process can, on the one hand, be particularly advantageously dissipated by the main body itself and, on the other hand, to the remaining portion of the body of the motor vehicle.

In particular, multiple channel-shaped receiving surfaces arranged next to one another and/or one behind the other can be understood as the plurality of channel-shaped receiving surfaces. In particular, receiving surfaces arranged next to one another can be arranged spaced apart from one another. Therefore, it can be ensured that pressurized gas tanks accommodated in the receiving surfaces arranged next to one another can be optimally accommodated in the receiving surfaces and, in particular, not touch one another. It can therefore be ensured that the pressurized gas tanks also continue to be interlockingly accommodated by the main body of the pressurized gas tank receiving assembly in the case of a thermal expansion of the pressurized gas tanks. Multiple channel-shaped receiving surfaces arranged next to one another and/or one behind the other can provide a particularly large area for accommodating the pressurized gas tanks. Therefore, a particularly large amount of heat arising during the refueling process can be absorbed and conducted from the pressurized gas tanks from a particularly large area, in particular a channel-shaped receiving surface, and dissipated to the body of the motor vehicle. In addition, the thermally conductive main body can be designed to be particularly flat due to multiple channel-shaped receiving surfaces arranged next to one another and/or behind one another. The channel-shaped receiving surfaces of the main body and the external shell surfaces of the pressurized gas tanks can each at least partially have an identical shape in a section. The channel-shaped receiving surfaces can each represent a circular arc in a section. The pressurized gas tanks can be designed to be essentially hollow cylindrical and the external shell surfaces of the pressurized gas tanks can each represent a circle in a section. The circular arc-shaped receiving surface can therefore particularly advantageously receive hollow cylindrical pressurized gas tanks and, thereby, particularly advantageously conduct the heat during the refueling process into the thermally conductive main body. A cooling of the pressurized gas tanks can therefore be particularly advantageous. It is also conceivable that the channel-shaped receiving surface is designed in the shape of a groove. The groove can have a box shape in a section. A box-shaped receiving surface can particularly advantageously accommodate box-shaped pressurized gas tanks and, thereby, support the thermal communication between the pressurized gas tank and the channel-shaped receiving surface.

The mounting interface can have holes for the passage of screws. The counter mounting interface of the body of the motor vehicle can have correspondingly arranged holes, in particular, a transverse and/or longitudinal member of the body of the motor vehicle can have correspondingly arranged holes. The main body of the pressurized gas tank receiving assembly can be arranged on the body of the motor vehicle by means of screws and nuts. An arrangement of this type can be particularly easily carried out. The arrangement of the mounting interface of the main body of the pressurized gas tank receiving assembly at the counter mounting interface of the body can also be carried out by welding. Therefore, a particularly stable arrangement can be carried out. In particular, an arrangement by means of welding can be particularly advantageous when the main body of the pressurized gas tank receiving assembly is to form a portion of the body of the motor vehicle.

Surfaces of the main body that can particularly advantageously conduct the heat from the main body to the body of the motor vehicle can be understood as thermally conductive surfaces of the main body. Thermally conductive surfaces can particularly advantageously contact the body such that the thermal resistance between the body and the thermally conductive surfaces is particularly low. The body of the motor vehicle can also have counter thermally conductive surfaces, which are situated opposite, in particular, the thermally conductive surfaces of the main body of the pressurized gas tank receiving assembly. In particular, the thermal resistance between the body and the thermally conductive surface can be lower than at other contact points of the body with the main body of the pressurized gas tank receiving assembly, for example, at the mounting interface and the counter mounting interface. In other words, the heat can be better conducted, in particular transferred, to the thermally conductive surfaces. With the thermally conductive surfaces of the main body and, in particular, together with the counter thermally conductive surfaces of the body of the motor vehicle, the heat from the pressurized gas tanks can be introduced, in a particularly targeted manner, into particularly favorable areas of the body and a particularly efficient dissipation of the heat is possible. The cooling of the pressurized gas tanks can therefore be carried out in a particularly efficient manner. It is also conceivable that the mounting interface of the main body of the pressurized gas tank receiving assembly has, in particular forms, the thermally conductive surfaces. The counter mounting interface of the body can then advantageously have counter thermally conductive surfaces. Therefore, the heat arising during the refueling process can be dissipated from the pressurized gas tanks to the body of the motor vehicle in a particularly easy way. The thermally conductive surfaces of the main body of the pressurized gas tank receiving assembly can have a thermally conductive adhesive and/or the counter thermally conductive surfaces of the body of the motor vehicle can have a thermally conductive adhesive. Therefore, particularly advantageous thermal communication can be achieved between the main body of the pressurized gas tank receiving assembly and the body of the motor vehicle. The heat arising during the refueling process can therefore be particularly advantageously conducted and dissipated to the body of the motor vehicle. The cooling of the pressurized gas tanks can therefore be carried out in a particularly efficient manner.

The main body can be designed in the shape of a box. The box-shaped main body can be particularly advantageously mounted between two longitudinal members of the body of the motor vehicle such that the heat arising during the refueling process can be particularly advantageously given off via the main body to the body. The box-shaped main body can have an interior space, wherein the box-shaped main body includes a plurality of channel-shaped receiving surfaces in the interior space. The box-shaped main body can have, on its outer side, a protruding rim encircling the box-shaped main body. The encircling, protruding rim can represent the mounting interface.

A fuel such as hydrogen, which is compressed, for example, to 700 bar to 800 bar or is compressed during the refueling process to 700 bar to 800 bar in the pressurized gas tanks can be understood as gas under high pressure. The pressurized gas tank receiving assembly according to the invention can also be suitable for other compressible fuels. In particular, the pressurized gas tank receiving assembly according to the invention can be utilized for dissipating heat generated by compression, which arises during the compression of a gas.

It can be advantageous when, in the case of a pressurized gas tank receiving assembly according to the invention, at least 15% of the external shell surface, preferably at least 25% of the external shell surface, of each pressurized gas tank is accommodated on the particular channel-shaped receiving surfaces of the main body for thermal communication with the main body. If the pressurized gas tank receiving assembly covers at least 15% of the external shell surface of each pressurized gas tank on the particular channel-shaped receiving surfaces of the main body for thermal communication with the main body, a particularly effective cooling of the pressurized gas tanks can take place. If the pressurized gas tank receiving assembly covers at least 25% of the external shell surface of each pressurized gas tank on the particular channel-shaped receiving surfaces of the main body for thermal communication with the main body, an even more effective cooling of the pressurized gas tanks can take place. The at least 15% or the at least 25% of the external shell surface of each pressurized gas tank can be one contiguous area. Advantageously, the thermally conductive main body, in particular the channel-shaped receiving surfaces of the thermally conductive main body of the pressurized gas tank receiving assembly, can be designed such that this/these accommodate the contiguous area of the particular pressurized gas tank. Therefore, the heat can be particularly efficiently conducted from the particular continuous area of the external shell surface of the pressurized gas tanks into the thermally conductive main body. A local dissipation of the heat from the pressurized gas tanks can therefore be enabled. It is also conceivable that the at least 15% or the at least 25% of the external shell surface of each pressurized gas tank is composed of at least two areas of the particular external shell surface that are separated from each other. Here, the thermally conductive main body, in particular the channel-shaped receiving surfaces of the thermally conductive main body, can be designed such that this/these each accommodate at least two areas of the particular pressurized gas tank that are separated from each other. For example, a thermally conductive main body of this type can include free spaces for this purpose. In particular, each of the channel-shaped receiving surfaces of the thermally conductive main body can have free spaces. Advantageously, the main body can have the particular channel-shaped receiving surfaces evenly distributed along the longitudinal direction of each pressurized gas tank and/or evenly distributed along a circumference of each pressurized gas tank. Therefore, the heat arising during the refueling process from the pressurized gas tanks can be particularly uniformly absorbed by the thermally conductive main body and conducted, in particular transferred, to the body of the motor vehicle.

Advantageously, in the case of a pressurized gas tank receiving assembly according to the invention, the main body can include at least one of the following elements:
- a thermally conductive element, in particular cooling fins and/or cooling ducts and/or a cooling plate, for cooling the main body,
- a thermally conductive elastic element between the pressurized gas tanks and the channel-shaped receiving surfaces in order to compensate for a thermal expansion of the pressurized gas tanks,
- a reinforcing element for stabilizing the main body.

The thermally conductive element, in particular cooling fins and/or cooling ducts and/or a cooling plate, can create, in particular, an additional thermal communication between the thermally conductive main body and the body of the motor vehicle. Due to the thermally conductive element, the thermal resistance between the body and the thermally conductive main body can be reduced. Consequently, the heat from the pressurized gas tanks can be given off via the main body to the body in an improved way. The thermally conductive element, in particular cooling fins and/or cooling ducts and/or a cooling plate, can be made of a thermally conductive material. The thermally conductive material can be a metal. For example, additional metal sheets can extend from the main body to the body of the motor vehicle. The metallic thermally conductive element, in particular cooling fins and/or cooling ducts and/or a cooling plate, can also contribute to the stability of the body of the motor vehicle. The thermally conductive material can also be a plastic having a highly thermally conductive filler. A thermally conductive element of this type, in particular cooling fins and/or cooling ducts and/or a cooling plate, can have a particularly low weight. Moreover, the thermally conductive element can be formed as one piece with the thermally conductive main body. As a result, the thermal resistance between the thermally conductive element and the thermally conductive main body can be kept particularly low. The thermally conductive element can also be arranged separately on the thermally conductive main body. The cooling fins and/or the cooling ducts and/or the cooling plate can also particularly advantageously dissipate heat from the thermally conductive main body to a fluid, for example, water or air. The heat arising during the refueling process can therefore be particularly advantageously conducted, in particular transferred, from the pressurized gas tanks via the thermally conductive main body to the body of the motor vehicle, since the thermal resistance of the thermally conductive main body can be kept low due to the cooling fins and/or the cooling ducts and/or the cooling plate.

Advantageously, the thermally conductive elastic element between the pressurized gas tanks and the channel-shaped receiving surfaces can create improved thermal communication between the thermally conductive main body and the thermally conductive pressurized gas tanks. In addition, due to the thermally conductive elastic element, the thermal expansion of the particular pressurized gas tank can be compensated for. In addition, the thermally conductive elastic element can be formed as one piece with the thermally conductive main body. As a result, the thermal resistance between the thermally conductive elastic element and the main body can be kept low. The thermally conductive element can also be separately formed and arranged on the main body. In particular, the channel-shaped receiving surfaces of the main body can each have or form thermally conductive elastic elements. As a result, the thermal expansion of the pressurized gas tanks can be particularly advantageously compensated for and it can be particularly advantageously ensured that the pressurized gas tanks are interlockingly accommodated by the main body during the refueling process. It can therefore be ensured that, during the refueling process, the heat from the pressurized gas tanks can be particularly efficiently conducted, in particular dissipated, via the thermally conductive main body to the body of the motor vehicle. The thermally conductive elastic element can have, as material, an elastic, thermally conductive plastic. A thermally conductive elastic element of this type can be particularly easily manufactured and have a particularly advantageous thermal conductivity.

The main body can include multiple reinforcing elements. Advantageously, it can be ensured due to the reinforcing elements of the main body that the pressurized gas tanks are particularly advantageously interlockingly accommodated on the channel-shaped receiving surfaces of the main body for thermal communication. In addition, the reinforcing elements can secure the pressurized gas tanks accommodated in the particular receiving surfaces against moving. The reinforcing elements can be made of a thermally conductive material and keep the thermal resistance of the thermally conductive main body low. This means that, due to the additional thermally conductive material of the reinforcing elements, the thermal mass of the thermally conductive main body can be increased and, thereby, the heat from the pressurized gas tanks can be particularly advantageously absorbed and dissipated. In addition, the reinforcing elements can be designed for being arranged on the body of the motor vehicle and/or the reinforcing elements can be arranged on the main body. Therefore, the reinforcing elements can further improve the dissipation of heat from the tanks to the main body and the body. In particular, spaces between the reinforcing elements and the main body can be designed such that optimal heat dissipation from the pressurized gas tanks to the main body takes place.

According to a second aspect, the present invention describes a system, wherein the system includes a motor vehicle and a cooling device for cooling a body of the motor vehicle. The motor vehicle includes a pressurized gas tank receiving assembly according to the invention and, furthermore, the body having the counter mounting interface, wherein the thermally conductive main body of the pressurized gas tank receiving assembly is arranged having the mounting interface at the counter mounting interface.

The body can include multiple counter mounting interfaces. The thermally conductive main body of the pressurized gas tank receiving assembly can also have multiple corresponding mounting interfaces. The pressurized gas tank receiving assembly can be arranged underneath the passenger compartment of the motor vehicle. It is also conceivable that the pressurized gas tank receiving assembly forms at least a portion of the underbody of the motor vehicle. The body can include longitudinal members and crossmembers. The longitudinal members and/or crossmembers can have, in particular represent, the counter mounting interface. In particular, the pressurized gas tank receiving assembly is arranged between two longitudinal members and/or between two crossmembers of the body of the motor vehicle. Therefore, the thermally communicating connection between the thermally conductive main body, in particular the thermally conductive surfaces, and the body can have a particularly low thermal resistance. Consequently, the heat from the pressurized gas tanks can be particularly efficiently transferred, in particular dissipated, to the body. The dissipation of the heat from the body can take place via the ambient air. This can represent a particularly cost-effective and efficient solution.

The motor vehicle can include a fuel cell system. The fuel cell system can include a fuel cell stack having fuel cells. In addition, the fuel cell system can include an air compressor for supplying the fuel cell stack with compressed air. In addition, the fuel cell system can have a cooling circuit for cooling the fuel cell system, in particular the fuel cell stack.

Particularly advantageously, in the case of a system according to the invention, the cooling device can include a fan of the motor vehicle and a cooling air guide element for guiding the cooling air conveyed from the fan to the body of the motor vehicle and/or the cooling device includes a cooling circuit of the motor vehicle and a cooling fluid guide element for guiding the cooling fluid to the body of the motor vehicle. This cooling device can also be understood as an internal cooling device.

The fan of the motor vehicle can be, in particular, one of the following fans:
fan of a liquid cooling of the engine,
fan blower for ventilating the interior space of a motor vehicle,
an air compressor of a fuel cell system of the motor vehicle.

The main radiator fan of the motor vehicle can be understood as the fan of the liquid cooling of the engine. The fan of the motor vehicle can also be an air compressor of the fuel cell system of the motor vehicle. The air compressor can guide the cooling air with particularly high pressure and a particularly high flow speed to the body of the motor vehicle. Therefore, heat can be particularly effectively dissipated. With a fan of the motor vehicle, the body of the motor vehicle can be cooled in a particularly simple and cost-effective way with the cooling air conveyed from the fan. Due to the cooling air, the heat arising during the refueling process can therefore be particularly advantageously dissipated from the pressurized gas tanks, in particular dissipated from the body of the motor vehicle. The cooling air guide element can guide the cooling air from the fan to the body and, thereby, dissipate the heat from the body. The cooling air guide element can include a tube between the fan and the body, through which the cooling air flows from the fan to the body. The cooling air guide element can also include multiple tubes as a fluid-communicating connection between the fan and the body. The tubes can guide the cooling air to different points of the body. In particular, the cooling air is guided by means of the cooling air guide element to the points of the body of the motor vehicle at which the body has a particularly high temperature in comparison to other points of the body. Therefore, heat can be particularly efficiently dissipated and the pressurized gas tanks can be cooled, in particular via the body of the motor vehicle. It is also conceivable that the cooling air is guided by means of the cooling air guide element to the points of the body at which the thermally conductive main body is arranged, with its thermally conductive surfaces, on the body of the motor vehicle. The cooling air guide element can also guide the cooling air to a thermally conductive element of the thermally conductive main body of the pressurized gas tank receiving assembly. Therefore, heat can be particularly advantageously dissipated. Advantageously, the cooling air can also be guided from the fan of the motor vehicle by means of the cooling air guide element to the thermally conductive main body and/or the pressurized gas tanks and, thereby, heat can be additionally dissipated.

The cooling circuit of the motor vehicle can be one of the following cooling circuits:
  cooling circuit for cooling an engine or a power electronics unit of the motor vehicle,
  refrigerant circuit, in particular a refrigerant circuit of an air conditioning system of the motor vehicle, for air conditioning the motor vehicle,
  cooling circuit for cooling a fuel cell system.

With a cooling circuit of the motor vehicle, the body of the motor vehicle can be cooled in a particularly simple and cost-effective way with the cooling fluid. The heat arising during the refueling process can therefore be particularly advantageously dissipated from the pressurized gas tanks, in particular, the arising heat can be dissipated from the pressurized gas tanks via the thermally conductive main body to the body of the motor vehicle. Heat can be dissipated by means of the cooling fluid. The cooling fluid guide element can guide the cooling fluid to the body and, thereby, dissipate the heat from the body. Preferably, cooling air can be guided from the fan, in particular the main radiator fan, to the cooling fluid guide element by means of the cooling air guide element. Therefore, the cooling fluid can be additionally cooled in the cooling fluid guide element and heat can be particularly efficiently dissipated from the body of the motor vehicle. The cooling fluid guide element can be a tube that guides the cooling fluid from the cooling circuit of the motor vehicle to the body. The cooling fluid guide element can also include multiple tubes, wherein the tubes guide the cooling fluid to different points of the body. The cooling fluid guide element can also include cooling hoses, wherein the cooling hoses are arranged on the body of the motor vehicle and/or around the pressurized gas tanks. The cooling fluid guide element can also guide the cooling fluid to a thermally conductive element of the thermally conductive main body of the pressurized gas tank receiving assembly. Therefore, heat can be particularly advantageously dissipated. In particular, the cooling fluid is guided by means of the cooling fluid guide element to the points of the body of the motor vehicle at which the body has a particularly high temperature in comparison to other points of the body. Therefore, heat can be particularly efficiently dissipated and the pressurized gas tanks can be cooled, in particular via the body of the motor vehicle. It is also conceivable that the cooling fluid is guided by means of the cooling fluid guide element to the points of the body at which the thermally conductive main body is arranged, with its thermally conductive surfaces, on the body of the motor vehicle. Advantageously, the cooling fluid can also be guided by means of the cooling fluid guide element to the thermally conductive main body and/or the pressurized gas tanks and, thereby, heat can be additionally dissipated. With the refrigerant circuit, in particular the refrigerant circuit of an air conditioning system of the motor vehicle, particularly cool cooling fluid can be guided to the body of the motor vehicle.

According to one further preferred embodiment of the system according to the invention, the cooling device can include an external cooling element for cooling the body of the motor vehicle, wherein the cooling element is arrangeable in the area of the motor vehicle and the cooling element is, in particular, one of the following elements:
  an external fan,
  an external water spraying device for spraying the motor vehicle with water,
  an external cooling chamber.

The external cooling element can be arranged in front of, behind, under, and/or over the motor vehicle. Preferably, the external cooling element is arranged under the motor vehicle, and so heat can be particularly efficiently dissipated via the cooling element from the body of the motor vehicle. The external cooling element can be understood as a cooling element that can, in fact, be carried along with the motor vehicle but is not fixedly connected to the motor vehicle in a normal state of the motor vehicle, such as, for example, the fixedly arranged main radiator fan of the motor vehicle. For example, a mobile fan can be carried along in the trunk of the motor vehicle, which is removable from the trunk during the refueling process. The external water spraying device can particularly efficiently cool the body of the motor vehicle during the refueling process, since water can store heat better than air under the same conditions. Additionally, water can additionally withdraw heat during evaporation from the body and, thereby, cool the body. The motor vehicle can include a fuel cell, wherein the external water spraying device then advantageously utilizes water for spraying that has been generated by the operation of the fuel cell of the motor vehicle. It is also conceivable that the water spraying device sprays the thermally conductive main body and/or the pressurized gas tanks of the pressurized gas tank receiving assembly with water, and so heat is additionally dissipated and it can be particularly advantageously ensured that the heat arising during the refueling process is guided from the pressurized gas tanks and, thereby, also from the gas under pressure in the pressurized gas tank, to the thermally conductive main body and is transferred via the thermally conductive main body to the body of the motor vehicle. Moreover, a filling station can also have the external cooling element.

The system according to the second aspect of the invention therefore has the same advantages as those described above with respect to the pressurized gas tank receiving assembly according to the first aspect of the invention.

According to a third aspect, the present invention describes a filling station for a system according to the invention including a motor vehicle and a cooling device. The filling station has a parking area where the motor vehicle is to be parked. In addition, the filling station has a filling station control unit including a data interface for communicating data with a counter data interface of the motor vehicle. Moreover, the filling station control unit is designed at least for recognizing a positive refueling process status of the motor vehicle based on the data communication between the data interface and the counter data interface and, upon recognition of the positive refueling process status, activating the cooling device in order to cool the body of the motor vehicle.

The filling station can have a pressurized gas tank fuel dispenser at the parking area of the filling station for providing a gas under high pressure. The pressurized gas tank fuel dispenser can include a refueling hose, wherein the refueling hose has the data interface for communicating data with the counter data interface of the motor vehicle. The motor vehicle can have the counter data interface on a fuel filler neck. The data interface and the counter data interface can be an infrared interface. A positive refueling process status of the motor vehicle can be present when the motor vehicle has been parked on the parking area, the motor vehicle is at a standstill, a fuel cell or a fuel cell system of the motor vehicle is not operating, and the pressurized gas tank fuel dispenser is connected in a fluid-communicating manner with the pressurized gas tanks of the pressurized gas tank receiving assembly. The filling station control unit can transmit data via the data interface to the counter data interface of the motor vehicle in order to activate the cooling device, in particular one of the fans of the motor vehicle and/or a cooling circuit of the motor vehicle in order to cool the body of the motor vehicle. The filling station control unit can also additionally activate, for example via electrical lines, the external cooling element of the cooling device, in particular when the filling station has the external cooling element. The activation of a fan can be understood as switching on the fan. Upon activation of the cooling circuit, a cooling circuit pump of the cooling circuit can be switched on. The cooling device can be controlled as a function of the temperature of the pressurized gas tank and/or as a function of the temperature of the thermally conductive main body of the pressurized gas tank receiving assembly and/or as a function of the temperature of the body of the motor vehicle.

It can be advantageous, in the case of a filling station according to the invention, when the cooling device includes the external cooling element of the cooling device for cooling the body of the motor vehicle, wherein the cooling element is arranged in the area of the motor vehicle and the cooling element is one of the following elements:
the external fan,
the external water spraying device for spraying the motor vehicle with water,
the external cooling chamber The external cooling element of the filling station can be arranged in front of, behind, under, and/or over the motor vehicle. Preferably, the external cooling element is arranged under the motor vehicle, and so heat can be particularly efficiently dissipated via the cooling element from the body of the motor vehicle. The external cooling element can be designed to be particularly powerful in comparison to a cooling element of the motor vehicle and, thereby, particularly advantageously cool the body of the motor vehicle. The filling station can have the external cooling element at the parking space. The cooling air conveyed from the external fan can be pre-cooled. This means that the cooling air is pre-cooled, for example, by a refrigerant circuit, to a temperature that is lower than the temperature of the ambient air. Therefore, the heat arising during the refueling process can be particularly advantageously dissipated from the body of the motor vehicle and, thereby, from the pressurized gas tanks. The external water spraying device of the filling station can particularly efficiently cool the body of the motor vehicle during the refueling process. Advantageously, the water with which the motor vehicle, in particular the body of the motor vehicle, is sprayed, can be pre-cooled. This means that the water is pre-cooled, for example, by a refrigerant circuit, to a temperature that is lower than the temperature of the ambient air. Therefore, the heat arising during the refueling process can be particularly advantageously dissipated from the body of the motor vehicle and, thereby, from the pressurized gas tanks. It is also conceivable that, for example, in the winter, a fluid other than water is utilized for spraying the motor vehicle, in particular the body.

Advantageously, in the case of a filling station according to the invention, the parking area can include an inspection pit having a fluid-permeable cover, wherein the cooling device for cooling the body of the motor vehicle is arranged in the inspection pit. The inspection pit can be formed on the parking space such that a motor vehicle is located over the inspection pit after having been parked on the parking space. The parking space can include markings for this purpose. Therefore, the body of the motor vehicle can be particularly advantageously, easily, and efficiently cooled by the cooling device. The fluid-permeable cover can be a grid, in particular a metal grid. The grid can withstand a particularly high load, such as a motor vehicle. The cooling device, for example, the external fan of the filling station and/or the external water spraying device, can cool the motor vehicle, in particular the body of the motor vehicle, particularly easily, without great flow resistance, through the grid.

The filling station according to the third aspect of the invention therefore has the same advantages as those described above with respect to the pressurized gas tank receiving assembly according to the first aspect of the invention and the system according to the second aspect of the invention.

According to a fourth aspect, the present invention describes a method for cooling a body of a motor vehicle according to the invention during the refueling of the motor vehicle of a system according to the invention at a filling station according to the invention, wherein the motor vehicle has the counter data interface, and wherein the method includes the following steps:
a) data communication between the data interface of the filling station and the counter data interface of the motor vehicle in order to ascertain the status of the refueling process,
b) recognizing the positive refueling process status by means of the filling station control unit,
c) activating the cooling device by means of the filling station control unit and/or by means of a vehicle control unit in order to cool the body of the motor vehicle and fill the pressurized gas tanks of the motor vehicle.

In the step a), the motor vehicle can transmit information to the filling station control unit regarding a temperature of the body of the motor vehicle and/or of the pressurized gas tank and/or of the thermally conductive main body. In addition, the motor vehicle can transmit information regarding the fill level of the pressurized gas tanks to the filling station control unit. This information can also be transmitted during the complete refueling process. The motor vehicle can also transmit this information to a control unit, which can be a vehicle control unit, of the motor vehicle, which is designed for controlling the cooling device of the motor vehicle. Due to the above-described information, the cooling device of the filling station and/or the cooling device of the motor vehicle can be actuated or activated such that a particularly efficient cooling of the motor vehicle, in particular of the body of the motor vehicle, by the cooling device can take place. Moreover, the motor vehicle can transmit the information to the filling station control unit that the motor vehicle, in particular the pressurized gas tank, and the filling station, in particular the pressurized gas tank fuel dispenser, are securely fluidically connected to each other and the vehicle is at rest and, thereby, the refueling process can be started. The information that the refueling process can be started can be understood as a positive refueling process status. In the step b) of the method, the filling station control unit recognizes the positive refueling process status. The recognition can take by via an evaluation of the data by the filling station control unit. In a next step c), the cooling device is activated by the filling station control unit and, in particular, the pressurized gas tanks of the motor vehicle are filled with gas. The filling station control unit can activate the cooling device of the filling station and/or the cooling device of the motor vehicle. In particular, the filling station control unit can actuate a control unit of the motor vehicle, which is designed for controlling the cooling device of the motor vehicle, wherein the control unit activates the cooling device of the motor vehicle. The filling of the pressurized gas tanks with the gas from the pressurized gas tank fuel dispenser and the activation of the cooling device can take place simultaneously. In addition, the filling station control unit can control the flow rate of the gas that flows from the pressurized gas tank fuel dispenser into the pressurized gas tanks of the motor vehicle such that the heat arising during the refueling process can be particularly advantageously dissipated from the vehicle, in particular from the body of the vehicle. This can mean that the filling station control unit controls the flow rate of the gas such that, at the beginning, in a first time interval, the flow rate increases, in particular continuously, up to a maximum flow rate value. In a subsequent second time interval, this maximum flow rate value can be maintained for a time and, in a subsequent third time interval, the flow rate of the gas can decrease, in particular continuously decrease, in particular toward zero. In an additional step of the method, the filling of the pressurized gas tanks can be terminated. This can mean that the gas no longer flows from the pressurized gas tank fuel dispensing system to the pressurized gas tanks of the motor vehicle. In particular, the filling station control unit can deactivate the cooling device, in particular the external cooling elements of the filling stations. Deactivate can be understood as switch off.

Advantageously, in a method according to the invention, after the step c) or after the additional step of terminating the filling, in the step d), the cooling device, in particular the cooling device of the motor vehicle, is deactivated only if the pressurized gas tanks have dropped below an establishable temperature threshold value. This means that the cooling device of the motor vehicle can remain activated, in particular after the termination of the filling of the pressurized gas tanks. Therefore, the heat can also continue to be dissipated from the motor vehicle, in particular from the body and/or from the pressurized gas tanks and/or from the thermally conductive main body, after the refueling process. This can have the advantage that the pressurized gas tanks can be brought to a temperature below an establishable temperature threshold value and, thereby, a risk to the passengers of the motor vehicle, for example, an explosion of a pressurized gas tank, can be minimized. The establishable temperature threshold value is advantageously below the critical pressurized gas tank temperature. The pressurized gas tanks can also be brought to a pressure below an establishable pressure threshold value. The establishable pressure threshold value is advantageously below the critical pressurized gas tank pressure. If the establishable temperature threshold value and/or the establishable pressure threshold value are/is fallen below, the cooling device of the motor vehicle can be deactivated, in particular by the control unit of the motor vehicle.

The method according to the fourth aspect of the invention therefore has the same advantages as those described above with respect to the pressurized gas tank receiving assembly according to the first aspect of the invention and the system according to the second aspect of the invention and the filling station according to the third aspect of the invention.

BRIEF DESCRIPTION OF THE DRAWINGS

Further measures which improve the present invention result from the following description of some exemplary embodiments of the present invention which is schematically represented in the figures. All features and/or advantages, including structural design details, spatial arrangements, and method steps, resulting from the claims, the description, or the drawings, can be essential to the invention alone or in the highly diverse combinations. It should be noted that the figures merely have descriptive character and are not intended to restrict the invention in any way. Schematically FIG. 8 shows an embodiment of a filling station according to the invention, FIG. 9 shows an embodiment of a filling station according to the invention, and FIG. 10 shows an embodiment of a method according to the invention.

In the following figures, identical reference characters are also utilized for the same technical features of different exemplary embodiments.

DETAILED DESCRIPTION

Figure 1:
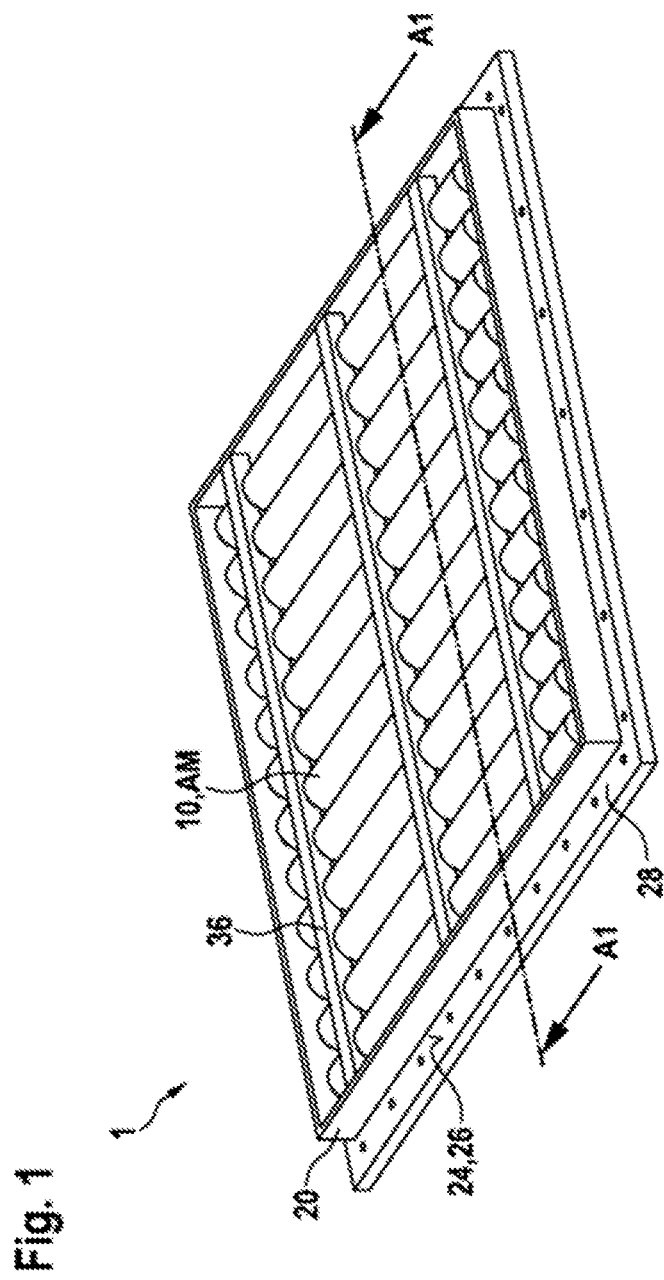
FIG. 1 shows an embodiment of a pressurized gas tank receiving assembly.
Figure 2:
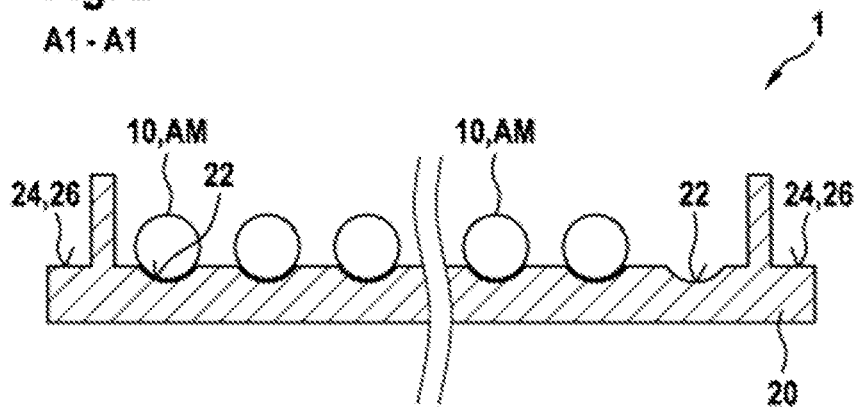
FIG. 2 shows the embodiment of the pressurized gas tank receiving assembly from FIG. 1 in a vertical cross section.

FIG. 1 shows, in a perspective view, one embodiment of a pressurized gas tank receiving assembly 1. The pressurized gas tank receiving assembly 1 has a thermally conductive main body 20, for example, made of steel. The body 20 can be designed in the shape of a box, wherein pressurized gas tanks 10 are accommodated in a plurality of channel-shaped receiving surfaces 22 (not apparent here) in an interior space of the box-shaped main body 20. The main body 20 has a protruding rim 28 encircling the box-shaped main body 20. The encircling, protruding rim 28 represents a mounting interface 26 and, simultaneously, a thermally conductive surface 24. The mounting interface 26 can have holes for the passage of screws. The main body 20 can be arranged with the mounting interface at a counter mounting interface 126 of a body 120 of a motor vehicle 100. The pressurized gas tanks 10 are thermally conductive and can be designed to be hollow cylindrical as in FIG. 1. The pressurized gas tanks 10 can be made, for example, of steel and particularly advantageously store gas under high pressure, such as, for example, hydrogen. In addition, three reinforcing elements 36 are additionally illustrated in FIG. 1, which secure the pressurized gas tanks 10 accommodated in the particular receiving surfaces 22 against moving and contribute to the stability of the main body 20. The heat arising during the refueling process can therefore be particularly advantageously dissipated from the pressurized gas tanks 10, in particular, the arising heat can be guided from the pressurized gas tanks 10 via the thermally conductive main body 20 to the body 120 of the motor vehicle 100. FIG. 2 shows the embodiment of the pressurized gas tank receiving assembly 1 from FIG. 1 in a vertical cross section A1-A1 (see cutting axis A1-A1 in FIG. 1). In FIG. 2, the thermally conductive pressurized gas tanks 10 are interlocking accommodated, with a particular external shell surface AM, by the main body 20 on the channel-shaped receiving surfaces 22 of the main body 20 for thermal communication. The channel-shaped receiving surfaces 22 are designed in the shape of a circular arc.

Figure 3:
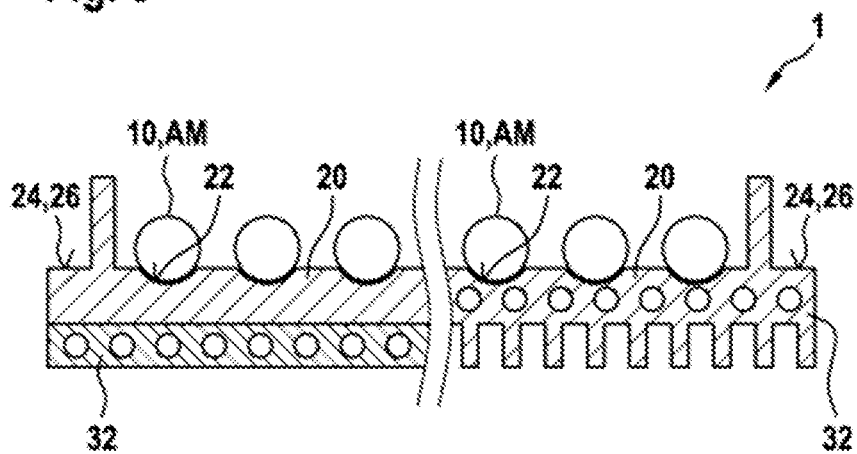
FIG. 3 shows a further embodiment of a pressurized gas tank receiving assembly according to the invention.

FIG. 3 describes two further embodiments of a pressurized gas tank receiving assembly 1 according to the invention, each in a vertical cross section (cf. cutting axis A1-A1 in FIG. 1). In both embodiments, pressurized gas tanks 10 are accommodated in channel-shaped receiving surfaces 22. In addition, both embodiments have a thermally conductive surface 24 and a mounting interface 26. The one further embodiment that is represented on the left shows a separate thermally conductive element 32, wherein the thermally conductive element 32 is a cooling plate, which is arranged on the main body 20. The thermally conductive element 32 additionally has cooling ducts in the cooling plate, through which, for example, a cooling fluid or cooling air can flow. The one further embodiment that is represented on the right shows a thermally conductive element 32, wherein the thermally conductive element 32 is one piece with the thermally conductive main body 20. The thermally conductive element 32 likewise has cooling ducts here. In addition, the thermally conductive element 32 includes cooling fins, through which cooling air can flow and, thereby, heat can be additionally dissipated from the thermally conductive main body 20.

Figure 4:
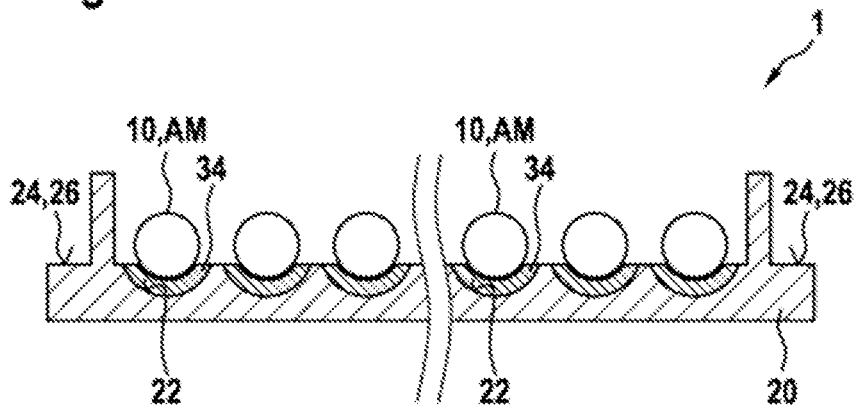
FIG. 4 shows a further embodiment of a pressurized gas tank receiving assembly according to the invention in a section.

FIG. 4 illustrates one further embodiment of a pressurized gas tank receiving assembly 1 according to the invention in a vertical cross section (cf. cutting axis A1-A1 in FIG. 1). In FIG. 4, pressurized gas tanks 10 are accommodated in channel-shaped receiving surfaces 22 arranged next to one another. In addition, the channel-shaped receiving surfaces 22 arranged next to one another are arranged spaced apart from one another. The pressurized gas tanks 10 accommodated in the receiving surfaces 22 therefore do not touch one another. It can therefore be ensured, furthermore, that the pressurized gas tanks 10 also continue to be interlockingly accommodated by the thermally conductive main body 20 of the pressurized gas tank receiving assembly 1 in the case of a thermal expansion of the pressurized gas tanks 10. In addition, FIG. 4 describes a thermally conductive elastic element 34 between each of the pressurized gas tanks 10 and the channel-shaped receiving surfaces 22, by means of which the thermal expansion of the particular pressurized gas tank 10 can be compensated for. The thermal expansion of the pressurized gas tanks 10 can occur due to the heat arising during the refueling process.

Figure 5:
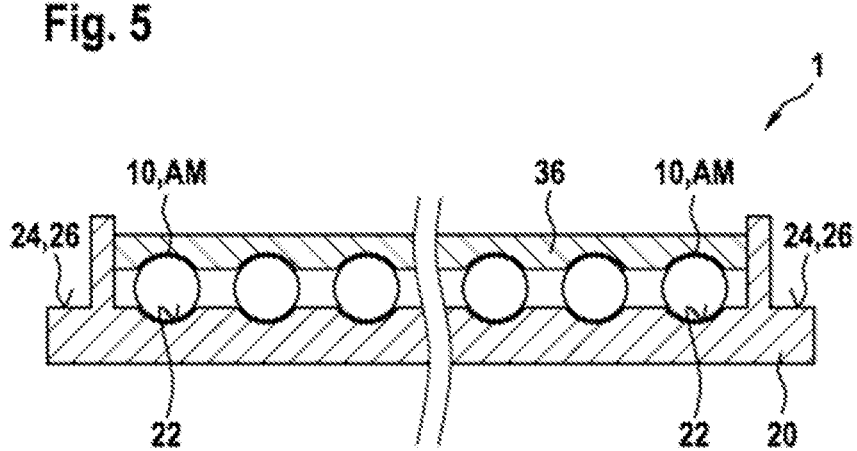
FIG. 5 shows a further embodiment of a pressurized gas tank receiving assembly according to the invention in a section.

FIG. 5 shows, in one further embodiment, a pressurized gas tank receiving assembly 1 according to the invention in a vertical cross section (cf. cutting axis A1-A1 in FIG. 1), wherein a reinforcing element 36 is represented in FIG. 5 as an addition to FIG. 2. This reinforcing element 36 secures the pressurized gas tanks 10 accommodated in the particular receiving surfaces 22 against moving and contributes to the stability of the main body 20.

Figure 6:
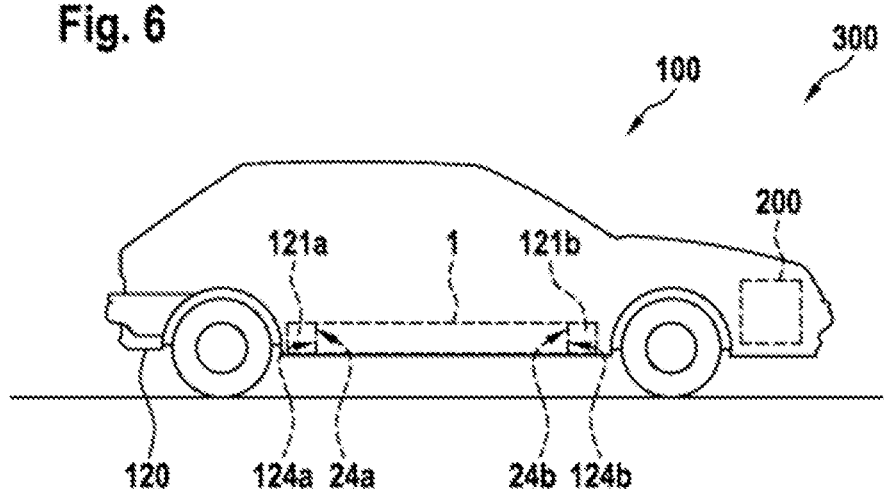
FIG. 6 shows an embodiment of a system according to the invention.

In FIG. 6, in one embodiment, a system 300 according to the invention including a motor vehicle 100 and a cooling device 200 for cooling a body 120 of the motor vehicle 100 is represented in a front view. In FIG. 6, the motor vehicle 100 includes an internal cooling device 200. A pressurized gas tank receiving assembly 1 forms at least a portion of the underbody of the motor vehicle 100. The motor vehicle 100, in particular the body 120, includes two crossmembers 121a and 121b, wherein the pressurized gas tank receiving assembly 1 is arranged at both crossmembers 121a, 121b. In particular, a thermally conductive main body 20 (not represented) of the pressurized gas tank receiving assembly 1 is arranged, with mounting interfaces 24a and 24b, at a counter mounting interface 124a of the crossmember 121a and at a counter mounting interface 124b of the crossmember 121b of the body 120, respectively.

Figure 7:
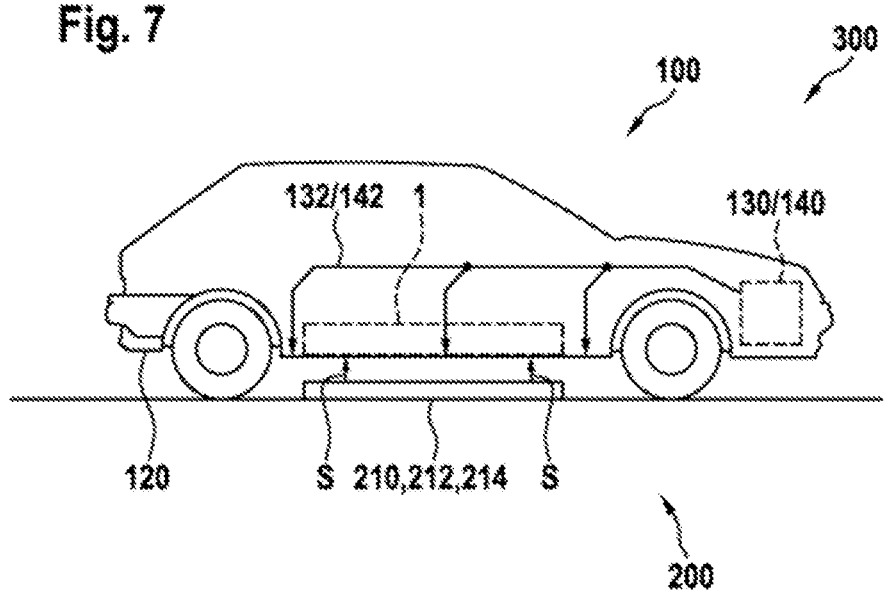
FIG. 7 shows an embodiment of a system according to the invention.

In FIG. 7, in one further embodiment, a system 300 according to the invention including a motor vehicle 100 and a cooling device 200 for cooling a body 120 of the motor vehicle 100 is represented in a front view. In FIG. 7, the cooling device 200 includes a fan 130 of the motor vehicle 100 and/or a cooling circuit 140 of the motor vehicle 100. By means of cooling air guide elements 132, cooling air conveyed by the fan 130 is conveyed to various points of the body 120 of the motor vehicle 100 and, via cooling fluid guide elements 142, a cooling fluid is guided to various points of the body 120 of the motor vehicle 100. In addition, the cooling device 200 includes an external cooling element 210 for cooling the body 120 of the motor vehicle 100. The external cooling element is an external fan 212 and/or an external water spraying device 214 for spraying the motor vehicle 100 with, for example, water. The external cooling element 210 is arranged under the motor vehicle. Air delivered from the external fan 212 and/or water delivered from the water spraying device 214 can flow/spray in the flow direction S, in particular essentially perpendicularly, against at least a portion of the body 120, advantageously against the entire body 120. Entirely advantageously, the air from the external fan 212 flows and/or the water from the water spraying device 214 sprays against the underbody of the body 120 of the motor vehicle 100.

In FIG. 8, in one embodiment, a filling station 500 according to the invention for a system 300 including a motor vehicle 100 and a cooling device 200 for cooling a body 120 of the motor vehicle 100 is represented in a front view. In FIG. 8, the motor vehicle 100 includes an internal cooling device 200. The filling station 500 has a parking area 510 where the motor vehicle 100 is to be parked. In addition, in FIG. 8, a pressurized gas tank fuel dispenser 520 is illustrated at the parking area 510 for providing a gas under high pressure. In FIG. 8, the pressurized gas tank fuel dispenser 520 includes a filling station control unit 560 having a data interface 562 for communicating data with a counter data interface 162 of the motor vehicle 100. The filling station control unit can also be arranged outside the pressurized gas tank fuel dispenser 520.

In FIG. 9, in one further embodiment, a filling station 500 according to the invention for a system 300 including a motor vehicle 100 and a cooling device 200 for cooling a body 120 of the motor vehicle 100 is represented in a front view. In FIG. 9, the cooling device 200 includes, on the one hand, a fan 130 of the motor vehicle 100 and/or a cooling circuit 140 of the motor vehicle 100. By means of cooling air guide elements 132, cooling air delivered by the fan 130 is conveyed to various points of the body 120 of the motor vehicle 100 and, via cooling fluid guide elements 142, a cooling fluid is guided to various points of the body 120 of the motor vehicle 100. The cooling air guide element 132 and the cooling fluid guide element 142 are not explicitly represented in FIG. 9. Moreover, the cooling device 200 includes an external cooling element 210. The filling station 500 has a parking area 510 where the motor vehicle 100 is to be parked. In addition, in FIG. 9, a pressurized gas tank fuel dispenser 520 is illustrated at the parking area 510 for providing a gas under high pressure. In FIG. 9, the pressurized gas tank fuel dispenser 520 includes a filling station control unit 560 having a data interface 562 for communicating data with a counter data interface 162 of the motor vehicle 100. The filling station control unit can also be arranged outside the pressurized gas tank fuel dispenser 520. The external cooling element 210 in this embodiment is arranged in an inspection pit 512 having a fluid-permeable cover 514. Due to the fluid-permeable cover 514, the body 120 of the motor vehicle 100 can be cooled particularly easily, without great flow resistance, by means of the cooling device 200, for example, by an external fan 212 and/or by the external water spraying device 214. Entirely advantageously, the air from the external fan 212 flows and/or the water from the water spraying device 214 sprays in the flow direction S against the underbody of the body 120 of the motor vehicle 100.

In FIG. 10, one embodiment of a method according to the invention for refueling a motor vehicle 100 is described. In a first step, data are communicated 602 between the data interface 562 of the filling station 500 and the counter data interface 162 of the motor vehicle 100 in order to ascertain the status of the refueling process. In the next step, the filling station control unit 560 recognizes 604 a positive refueling process status. Next, the cooling device 200 is activated 606 by the filling station control unit 560 in order to cool the body 120 of the motor vehicle 100 and fills 608 the pressurized gas tanks 10 of the motor vehicle 100. Thereafter, the filling of the pressurized gas tanks 10 is terminated 610. The cooling device 200 can remain activated after the termination 610 of the filling of the pressurized gas tanks 10 and, in an additional step, become deactivated 612 only if the pressurized gas tanks 10 have fallen below an establishable temperature threshold value. This can mean, for example, that the fan 130 and the cooling circuit 140 of the motor vehicle also remain activated during subsequent further travel with the motor vehicle 100, at least for the time until the establishable temperature threshold value is fallen below.

The invention claimed is:

1. A pressurized gas tank receiving assembly (1) for a motor vehicle (100) for cooling pressurized gas tanks (10), wherein the pressurized gas tank receiving assembly (1) includes:
a) a main body (20) having a plurality of channel-shaped receiving surfaces (22) for accommodating the pressurized gas tanks (10), wherein the main body (20) is thermally conductive and has a mounting interface (26) for arrangement at a counter mounting interface (126) of a body (120) of the motor vehicle (100), wherein the main body (20) has thermally conductive surfaces (24) for a thermally communicating connection with the body (120),
b) pressurized gas tanks (10) for storing gas under high pressure, wherein the pressurized gas tanks (10) are thermally conductive and are interlockingly accommodated on the channel-shaped receiving surfaces (22) of the main body (20) for thermal communication with the main body (20),
wherein the main body (20) includes a thermally conductive elastic element (34) between the pressurized gas tanks (10) and the channel-shaped receiving surfaces (22) to compensate for a thermal expansion of the pressurized gas tanks (10).

2. The pressurized gas tank receiving assembly (1) as claimed in claim 1,
wherein
at least 15% of the external shell surface (AM) of each pressurized gas tank (10) is accommodated at the respective channel-shaped receiving surfaces (22) of the main body (20) for thermal communication with the main body (20).

3. The pressurized gas tank receiving assembly (1) as claimed in claim 2, wherein
at least 25% of the external shell surface (AM) of each pressurized gas tank (10) is accommodated at the respective channel-shaped receiving surfaces (22) of the main body (20) for thermal communication with the main body (20).

4. The pressurized gas tank receiving assembly (1) as claimed in claim 1,
wherein
the main body (20) includes
a thermally conductive element (32) for cooling the main body, and
a reinforcing element (36) for stabilizing the main body (20).

5. The pressurized gas tank receiving assembly (1) as claimed in claim 4, wherein the thermally conductive element (32) is cooling fins and/or cooling ducts and/or a cooling plate.

6. A system (300), wherein the system (300) includes a motor vehicle (100) and a cooling device (200) for cooling a body (120) of the motor vehicle (100), wherein the motor vehicle (100) includes:
a) a pressurized gas tank receiving assembly (1) as claimed in claim 1,
b) the body (120) having the counter mounting interface (124), wherein the thermally conductive main body (20) of the pressurized gas tank receiving assembly (1) is arranged with the mounting interface (24) at the counter mounting interface (124).

7. The system (300) including the motor vehicle (100) and the cooling device (200) as claimed in claim 6,
wherein
the cooling device (200) includes a fan (130) of the motor vehicle (100) and a cooling air guide element (132) for guiding the cooling air conveyed from the fan (130) to the body (120) of the motor vehicle (100), and/or wherein the cooling device (200) includes a cooling circuit (140) of the motor vehicle (100) and a cooling fluid guide element (142) for guiding cooling fluid to the body (120) of the motor vehicle (100).

8. The system (300) including the motor vehicle (100) and the cooling device (200) as claimed in claim 6,
wherein the cooling device (200) includes an external cooling element (210) for cooling the body (120) of the motor vehicle (100), wherein the cooling element (210) is arrangeable in an area of the motor vehicle (100) and the cooling element (210) is one of the following elements:
an external fan (212),
an external water spraying device (214) for spraying the motor vehicle (100) with water,
a cooling chamber.

9. A filling station (500) for a system (300) having a motor vehicle (100) and a cooling device (200), wherein the filling station (500) includes:
a) a parking area (510) where the motor vehicle (100) is to be parked,
b) a filling station control unit (560) having a data interface (562) for communicating data with a counter data interface (162) of the motor vehicle (100), wherein the filling station control unit (560) is designed at least for recognizing a positive refueling process status (S1) of the motor vehicle (100) based on data communication between the data interface (562) and the counter data interface (162) and, upon recognition of the positive refueling process status (S1), activating the cooling device (200) in order to cool a body (120) of the motor vehicle (100),
wherein the parking area (510) includes an inspection pit (512) having a fluid-permeable cover (514), wherein the cooling device (200) is arranged in the inspection pit (512) for cooling the body (120) of the motor vehicle (100).

10. The filling station (500) as claimed in claim 9, wherein
the filling station (500) includes an external cooling element (210) of the cooling device (200) for cooling the body (120) of the motor vehicle (100), wherein the cooling element (210) is arrangeable in an area of the motor vehicle (100) and the cooling element (210) is one of the following elements:
an external fan (212),
an external water spraying device (214) for spraying the motor vehicle (100) with water,
a cooling chamber.

11. A method for cooling a body (120) of a motor vehicle (100) during refueling of the motor vehicle (100) at a filling station (500), wherein the filling station (500) includes a parking area (510) where the motor vehicle (100) is to be parked, a filling station control unit (560) having a data interface (562) for communicating data with a counter data interface (162) of the motor vehicle (100), wherein the parking area (510) includes an inspection pit (512) having a fluid-permeable cover (514), wherein a cooling device (200) is arranged in the inspection pit (512) for cooling the body (120) of the motor vehicle (100), and wherein the method includes the following steps:
a) data communication (602) between the data interface (562) of the filling station (500) and the counter data interface (162) of the motor vehicle (100) in order to ascertain a status of the refueling process,
b) recognizing (604) a positive refueling process status via the filling station control unit (560),
c) activating (606) the cooling device (200) via the filling station control unit (560) and/or via a vehicle control unit in order to cool the body (120) of the motor vehicle (100) and fill (608) pressurized gas tanks (10) of the motor vehicle (100).

12. The method as claimed in claim 10, wherein the method includes, after the step c), the following step d):
d) deactivating (612) the cooling device (200) if the pressurized gas tanks (10) have fallen below an establishable temperature threshold value.

* * * * *